US006495187B1

(12) United States Patent
Borders et al.

(10) Patent No.: US 6,495,187 B1
(45) Date of Patent: *Dec. 17, 2002

(54) METHOD FOR THE USE OF ISOLATED SOY PROTEIN IN THE PRODUCTION OF FRESH, UNRIPENED CHEESE ANALOGS AND CHEESE ANALOGS

(75) Inventors: Cheryl Borders, Moweaqua, IL (US); Victor Lobo, Decatur, IL (US); W. Russell Egbert, Decatur, IL (US); Lewis True, Indianapolis, IN (US); Thomas Gottemoller, Mt. Zion, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/674,711

(22) PCT Filed: Sep. 28, 2000

(86) PCT No.: PCT/US00/26558

§ 371 (c)(1),
(2), (4) Date: Nov. 30, 2000

(87) PCT Pub. No.: WO01/22830

PCT Pub. Date: Apr. 5, 2001

Related U.S. Application Data

(63) Continuation of application No. 09/408,074, filed on Sep. 29, 1999, now Pat. No. 6,413,569.

(51) Int. Cl.$^7$ .............................................. A23C 20/00
(52) U.S. Cl. ......................... 426/582; 426/36; 426/40; 426/46; 426/656
(58) Field of Search ................................. 426/573, 575, 426/580, 582, 34, 36, 40, 44, 46, 49, 52, 629, 634, 656

(56) References Cited

U.S. PATENT DOCUMENTS

| | | | |
|---|---|---|---|
| 2,604,405 A | 7/1952 | Petersen | 99/116 |
| 3,806,606 A | 4/1974 | Seiden | 426/188 |
| 3,941,891 A | 3/1976 | Kasik et al. | 426/94 |
| 4,080,477 A | 3/1978 | Tsumura et al. | 426/656 |
| 4,172,828 A | 10/1979 | Davidson et al. | 260/123.5 |
| 4,197,322 A | 4/1980 | Middleton | 426/36 |
| 4,346,122 A | 8/1982 | Orthoefer et al. | 426/656 |
| 4,349,576 A | 9/1982 | Lehnhardt et al. | 426/582 |
| 4,397,926 A | 8/1983 | Galal et al. | 426/582 |
| 4,435,438 A | 3/1984 | Lehnhardt et al. | 426/656 |
| 4,486,343 A | 12/1984 | Walker et al. | 260/112 G |
| 4,497,834 A | 2/1985 | Barta | 426/42 |
| 4,556,569 A | 12/1985 | Brander et al. | 426/104 |
| 4,608,265 A | 8/1986 | Zwiercan et al. | 426/582 |
| 4,678,676 A | 7/1987 | Ishizuka et al. | 426/573 |
| 4,684,533 A | 8/1987 | Kratochvil | 426/575 |
| 4,937,091 A | 6/1990 | Zallie et al. | 426/582 |
| 5,061,504 A | 10/1991 | Kong-Chan et al. | 426/582 |
| 5,064,660 A | 11/1991 | Silver | 426/36 |
| 5,676,984 A | 10/1997 | Bohanan et al. | 426/34 |
| 5,807,601 A | 9/1998 | Carpenter et al. | 426/578 |
| 5,902,625 A | 5/1999 | Barz et al. | 426/582 |
| 5,935,634 A | 8/1999 | Gamay et al. | 426/582 |
| 6,093,424 A | 7/2000 | Han et al. | 426/42 |
| 6,107,468 A | 8/2000 | Boatright | 530/378 |

FOREIGN PATENT DOCUMENTS

| | | |
|---|---|---|
| EP | 0 089 777 A2 | 9/1983 |
| EP | 0 711 504 A1 | 5/1996 |
| EP | 0 815 736 A1 | 1/1998 |
| WO | 01/22829 | 4/2001 |
| WO | 01/22830 | 4/2001 |

OTHER PUBLICATIONS

Fox, P.F., Cheese: Chemistry, Physics and Microbiology, Chapman and Hall, p. 396 (1993).
English language abstract for JP 54–10554, Derwent World Patents Index Accession No. 1979–72504B.
English language abstract for SU 1 205 870, FSTA/IFIS Accession No. 87–1–02–v0159.
International Search Report for PCT/US00/26558, mailed Jan. 12, 2001.
Del Valle, F.R. et al., "Simultaneous Curdling of Soy/Cow's Milk Blends with Rennet and Calcium or Magnesium Sulfate, Utilizing Soymilk Prepared from Soybeans or Full–Fat Soy Flour," *J. Food Sci.* 49 :1046–1052, The Institute of Food Technologists (1984).
Kosikowski, F.V. and Mistry, V.V., "Biology of a Ripening Cheese," Cheese and Fermented Milk Foods, 3$^{rd}$ Ed., pp. 386–421, F.V. Kosikowski, L.L.C., Westport, CT (1997).
Kosikowski, F.V. and Mistry, V.V., "Appendix," *Cheese and Fermented Milk Foods*, 3$^{rd}$ Ed., p. 698, F.V. Kosikowski, L.L.C., Westport, CT (1997).
Databse FSTA Online, International Food Information Service (IFIS), English abstract of Smietana, Z., "Study of guided modification of milk proteins for processing purposes," Zeszyty Naukowe Akademii Rolniczo Technicznej w Olsztynie, Technologia Zwynosci (14):123–184 (1979).
Database FSTA Online, International Food Information Service (IFIS), English abstract of Venkatachalam, N. et al., "Effect of soy protein isolate on rennet coagulation of milk and microstructures of cheese curd," *IFT Annual Meeting*, Dept. of Nutrition and Food Science, Utah State University, p. 124 (1995).
Database WPI, English language abstract of SU 1 785 421 A (1992).

(List continued on next page.)

Primary Examiner—Leslie Wong
(74) Attorney, Agent, or Firm—Sterne, Kessler, Goldstein & Fox PLLC

(57) ABSTRACT

The present invention relates, in general, to fresh, unripened cheese analog and a method for making a fresh, unripened cheese analog by incorporating isolated soy protein. The invention also relates to hard, ripened cheeses or cheese analogs and methods for making hard, ripened cheeses or cheese analogs by incorporating isolated soy protein.

18 Claims, No Drawings

OTHER PUBLICATIONS

International Search Report of International Application No. PCT/US00/24871, mailed Feb. 5, 2001.

English Translation of Russian Patent Application No. SU 1205870 A.

English language abstract for Russian Patent Publication No. SU 1205870 A, Derwent World Patents Index Accession No. 1986–224540.

Pending Non–Provisional United States Patent Application No. 09/408,075, Gottemoller et al., filed Sep. 29, 1999.

Pending Non–Provisional U.S. patent application No. 09/693,950, Gottemoller et al., filed Oct. 23, 2000.

Pending Non–Provisional U.S. patent application No. 09/408,074, Borders et al., filed Sep. 29, 1999.

METHOD FOR THE USE OF ISOLATED SOY PROTEIN IN THE PRODUCTION OF FRESH, UNRIPENED CHEESE ANALOGS AND CHEESE ANALOGS

CROSS-REFERENCE TO RELATED APPLICATIONS

This application is a §371 of PCT Application No. PCT/US00/26558, filed Sep. 28, 2000, which is a continuation of U.S. Application No. 09/408,074, filed Sep. 29, 1999, now U.S. Pat. No. 6,413,569, both of which applications are herein incorporated by reference. PCT/US00/26558 published on Apr. 5, 2001 as WO 01/22830.

BACKGROUND OF THE INVENTION

1. Field of the Invention

The present invention relates, in general, to fresh, unripened cheese analog and a method for making a fresh, unripened cheese analog by incorporating isolated soy protein. The invention also relates to hard, ripened cheeses or cheese analogs and methods for making hard, ripened cheeses or cheese analogs by incorporating isolated soy protein.

2. Background Information

While the art of cheesemaking has been practiced for centuries, the cheesemaker is always looking for ways to improve the finished cheese yield obtained from the starting quantity of milk. This becomes very important in areas of the world where the milk supply is limited. Attempts have been made over the years to incorporate soy protein as an economic replacement for milk proteins. Problems can be encountered due to differences between milk and soy proteins in molecular and functional properties which can affect the quality of the finished cheese.

Therefore, a method is provided which incorporates isolated soy protein into a coagulated milk matrix.

SUMMARY OF THE INVENTION

The invention provides a method for making a fresh, unripened cheese analog comprising, (a) mixing isolated soy protein and milk; (b) adding a coagulating agent, and/or bacterial cultures to said mixture from (a); (c) cutting the product resulting from (b); (d) agitating the product resulting from (c) for about 40 to about 60 minutes at a temperature selected from the range of about 30° C. to about 50° C.; (e) separating about 50 to about 80% of whey from product resulting from (d); and (f) placing product resulting from (d) in molds and placing molds at a temperature of at least about 28° C. for about 2 to about 8 hours.

The invention also relates to a method for making a hard, ripened cheese or cheese analog comprising (a) mixing isolated soy protein and milk; (b) adding a coagulating agent, and/or bacterial cultures to said mixture from (a); (c) cutting product resulting from (b); (d) agitating the product resulting from (c) for about 40 to about 60 minutes at a temperature of from about 30° C. to about 70° C.; (e) separating about 50 to about 80% of whey from product resulting from (d); (f) processing the product resulting from (e) to produce the desired type of cheese or cheese analog; and (g) placing product resulting from (f) in molds and placing the molds at a temperature appropriate for the desired type of cheese or cheese analog, for a length of time necessary to begin the ripening process.

DETAILED DESCRIPTION OF THE INVENTION

The invention provides a method for making a fresh, unripened cheese and cheese analog comprising, (a) mixing isolated soy protein and milk; (b) adding a coagulating agent, and/or bacterial cultures to said mixture from (a); (c) cutting the product resulting from (b); (d) agitating the product resulting from (c) for about 40 to about 60 minutes at a temperature selected from the range of about 30° C. to about 50° C.; (e) separating about 50 to about 80% of whey from product resulting from (d); and (f) placing product resulting from (d) in molds and placing molds at a temperature of at least about 28° C. for about 2 to about 8 hours.

The invention also relates to a method for making a hard, ripened cheese or cheese analog comprising (a) mixing isolated soy protein and milk; (b) adding a coagulating agent, and/or bacterial cultures to said mixture from (a); (c) cutting product resulting from (b); (d) agitating the product resulting from (c) for about 40 to about 60 minutes at a temperature of from about 30° C. to about 70° C.; (e) separating about 50 to about 80% of whey from product resulting from (d); (f) processing the product resulting from (e) to produce the desired type of cheese or cheese analog; and (g) placing product resulting from (f) in molds and placing the molds at a temperature appropriate for the desired type of cheese or cheese analog, for a length of time necessary to begin the ripening process.

The milk used in the present invention may be present in amounts of from about 95% to about 99.99%, and preferably from about 98% to about 99.99%. The milk may comprise of from about 0% to about 10% fat and preferably from about 0.5% to about 5% fat. It may be desirable to use milk with a low fat content and optionally add fat from other sources. As such, the fat contained in the milk may originate from at least one of the compounds of the group comprising milkfat or vegetable oil.

The invention provides the above and below described methods wherein said soy protein is present in amounts of from about 10% to 100% by weight, and preferably from about 15% to about 50%. By "percent" it is meant weight percent based on the calculated amount of casein solids in the milk. The isolated soy protein used in the present invention may be prepared by pH adjusting soy curd prior to spray drying or by blending different isolated soy proteins to obtain the desired pH. The pH of the isolated soy protein(s) may be of from about 3 to about 7, and preferably of from about 4.5 to about 6.0.

In one embodiment, the present invention provides a method of making a fresh, unripened cheese analog by adding at least one compound to a mixture of isolated soy protein and milk, wherein said compound is selected from the group comprising transglutaminase, starch, a whitening agent, hydrocolloid gum, calcium chloride, and a coagulating enzyme.

In another embodiment, the present invention provides a method of making a hard, ripened cheese or cheese analog by adding at least one compound to a mixture of isolated soy protein and milk, wherein said compound is selected from the group comprising transglutaminase, starch, a whitening agent, hydrocolloid gum, calcium chloride, and a coagulating enzyme.

Transglutaminase is an enzyme which crosslinks proteins and which aids in crosslinking the isolated soy protein and milk proteins. The transglutaminase catalyzed crosslinks serve to compatibilize the soy and milk proteins. These crosslinks help in improving the functionality of the different proteins and therefore improving the texture of the finished product. Transglutaminase is preferably present in amounts from about 0% to about 1.0%, and preferably from about 0% to about 0.2%.

As a binder or filler in the cheese, generally any starch which is at least partially soluble in water at the described temperatures can be employed in the cheese or cheese analog making method of the present invention. Corn and potato starches are types of binder that may be used. The preferred starch should be pregelatinized by mixing with water and heating to its gelatinization temperature prior to addition to the milk. The gelatinized starch may optionally be added in amounts of from about 0% to about 20%, and preferably from about 0% to about 10%.

Often it is desirable to produce a cheese analog with a white appearance. As such, the present invention provides for the optional addition of a whitening agent in amounts of from about 0% to about 0.5%, preferably from about 0% to about 0.1%. The whitening agent must be chemically inert and harmless to the animal or human who ingests the agent, but, of course also must make the appearance of the cheese white. The invention provides the herein described methods wherein said whitening agent may be selected from the group comprising titanium dioxide, benzoyl peroxide, or green and blue food colorings.

A hydrocolloid gum may be optionally added as a stabilizer to improve the yield of the cheese, and may be added in amounts of from about 0% to about 2%, and preferably from about 0% to about 0.8%. The hydrocolloid gum can be selected from the group comprising carrageenan, carob bean, guar and xanthan.

The invention provides a method for producing a soft, sliceable, unripened cheese-like product. Firming agents may optionally be added to firm the curd. Preferably, calcium chloride is added to produce a firm cheese curd and can be added in amounts of from about 0% to about 0.5%, preferably from about 0% to about 0.2%.

The invention also provides a method for producing a hard, sliceable, meltable, ripened cheese or cheese-like product. Firming agents may optionally be added to firm the curd. Preferably, calcium chloride is added to produce a firm cheese curd and can be added in amounts of from about 0% to about 0.5%, preferably from about 0% to about 0.2%.

Following step (a), above, a coagulating enzyme may be used to speed the coagulation process, and may be added in catalytic amounts. The coagulating enzyme may be selected from the group comprising rennet and its synthetic equivalents. Preferred rennet preparations can be selected from the group comprising AmericanPure, (SBI-Systems Bio-Industries, calf rennet purified via ion-exchange), Chy-Max (Pfizer, fermentation—using *Escherichia coli* K-12), Chymogen (Chris Hansen, fermentation—using *Aspergillus niger* var. *awamori*), ChymoStar (Rhône-Poulenc, fermentation—using *Aspergillus niger* var. *awamori*), Maxiren (Gist-Brocades, Fermentation—using *Kluyveromyces marxianus* var. *lactis*), Novoren (Marzyme GM) (Novo Nordisk, Fermentation—using *Aspergillus oryzae*). Kosikowski, F. V. and Mistry, V. V. (1997), "Cheese and Fermented Milk Foods," 3rd edn., F. V. Kosikowski, L. L. C., Westport, Conn., pp. 395 and 698.

Following step (a), above, a bacterial culture may optionally be added to the resulting mixture. The bacterial cultures can be added to the mixture to produce a desired flavor of cheese or to aid in acid development. Furthermore, these bacterial cultures may be added in lieu of, or in addition to, a coagulating agent. The types of bacterial cultures to be added to the mixture is obvious to one skilled in the art of making cheese. Examples of bacterial cultures that may be added to the mixture include, but are not limited to, *Lactobacillus Bulgaris, Lactobacillus Lactus, Lactobacillus Helveticus, Streptococcus Thermophilus, Streptococcus Cremoris, Streptococcus Diacetilactis, Streptococcus Lactus, Streptococcus Durans, Leuconostoc Faecalis, Leuconostoc Citrovorum, Leuconostoc Dextranicum*. The bacterial cultures may be added individually, or as mixtures of bacterial cultures that contain 2 or more different species of bacteria. Appropriate mixtures of bacterial cultures are readily apparent to one skilled in the art.

A mixture comprising curds and whey results after step (d), above. The whey may be separated from the remainder of the above and below described mixtures by at least one of the methods selected from the group comprising draining, straining and filtering. Preferably, said separating results in elimination of from about 50% to 80% of the whey, and even more preferably, results in elimination of from about 60 to 70% of the whey.

After separating a percentage of the whey from the rest of the above described mixtures, the mixture is further processed to produce the appropriate type of cheese or cheese analog. The processing required to produce various types o cheeses or cheese analogs at this stage in the method is obvious to one skilled in the art of cheese-making. The mixture is also salted to improve flavor and texture. The salting agent can be selected from the group comprising sodium chloride. The salted, processed mixture is poured into molds to shape the cheese. The mixture in the molds may also optionally be externally pressed to remove moisture from the cheese or cheese analog. The resulting cheese composition after comprises from about 2% to about 17% soy isolate.

The present invention is described in further detail in the following non-limiting examples.

EXAMPLE

Example 1

Isolated soy protein was prepared by pH adjusting soy curd prior to spray drying. The pH of the isolated soy protein ranged from between 4.5 to 6.0. 2650 grams of milk were placed in a vat. Twenty eight grams of isolated soy protein was incorporated into 300 grams of milk with high shear agitation or the use of a homogenizer. The isolated soy protein/milk mixture was added when the milk in the vat reached a temperature of 32° C. Six grams of calcium chloride was dissolved in water then added to the mixture in the vat, followed by the synthetic rennet. The milk/soy protein matrix was then allowed to coagulate for a period of 40 minutes. The curd was then cut using cheese knives and allowed to "heal" for 5 minutes. The cut curds were then agitated occasionally for about 40 minutes and allowed to cook at a temperature of 37° C. Approximately 60–70% of the whey was drained and 3.5% salt was incorporated, based on the weight of the remaining whey and curds. The salted whey/curd mixture was poured into molds and allowed to set for 4 hours, without external pressing, at a minimum temperature of 28° C. After four hours, the molds were placed in refrigerated storage overnight. The finished cheese was removed from the mold and packaged. The weight of the finished cheese product was increased by 3 to 12.5% compared to the product produced without the addition of isolated soy protein.

Example 2

Isolated soy protein was prepared by blending different isolated soy proteins to obtain the desired pH. The pH of the isolated soy protein ranged from 4.5 to 6.0. 2650 grams of milk were placed in a vat. Twenty-eight grams of an isolated soy protein blend and 6 grams of a 50% titanium dioxide dispersion were incorporated into 300 grams of milk with high shear agitation or the use of a homogenizer. The isolated soy protein/milk/titanium dioxide mixture was added when the milk in the vat reached a temperature of 32° C. Six grams of calcium chloride was dissolved in water then added to the mixture in the vat, followed by the synthetic rennet. The milk/soy protein matrix was then allowed to coagulate for a period of 40 minutes. The curd was then cut using cheese knives and allowed to "heal" for 5 minutes. The cut curds were then agitated occasionally for about 40 minutes and allowed to cook at a temperature of 37° C. Approximately 60–70% of the whey was drained and 3.5% salt was incorporated, based on the weight of the remaining whey and curds. The salted whey/curd mixture was poured into molds and allowed to set for 4 hours, without external pressing, at a minimum temperature of 28° C. After four hours, the molds were placed in refrigerated storage overnight. The finished cheese was removed from the mold and packaged. The weight of the finished cheese product was increased by 9 to 14% compared to the product produced without the addition of isolated soy protein.

Example 3

Isolated soy protein was prepared by either adjusting the soy curd prior to spray drying or by blending different isolated soy proteins to obtain the desired pH. The pH of the isolated soy protein or isolated soy protein blends ranged from 4.5 to 6.0. 2650 grams of milk were placed in a vat. Twenty-eight grams of the isolated soy protein or isolated soy protein blend; 6 grams of a 50% titanium dioxide dispersion; and I activity unit of transglutaminase were incorporated into 300 grams of milk with high shear agitation or the use of a homogenizer. The isolated soy protein/ milk/titanium dioxide/transglutaminase mixture was added when the milk in the vat reached a temperature of 32° C. Six grams of calcium chloride was dissolved in water then added to the mixture in the vat, followed by the synthetic rennet. The milk/soy protein matrix was then allowed to coagulate for a period of 40 minutes. The curd was then cut using cheese knives and allowed to "heal" for 5 minutes. The cut curds were then agitated occasionally for about 40 minutes and allowed to cook at a temperature of 37° C. Approximately 60–70%.of the whey was drained and 3.5% salt was incorporated, based on the weight of the remaining whey and curds. The salted whey/curd mixture was poured into molds and allowed to set for 4 hours, without external pressing, at a minimum temperature of 28° C. After four hours, the molds were placed in refrigerated storage overnight. The finished cheese was removed from the mold and packaged. The weight of the finished cheese product was increased by 16.5 to 23% compared to the product produced without the addition of transglutaminase and isolated soy protein.

Example 4

A Manchego cheese was made using the following procedure. Isoalted soy protein was prepared by pH adjusting soy curd prior to spray drying. The pH of the isolate soy protein ranged between 4.5 to 6.0. 2.3 pound of the isolated soy protein was added to 500 pound of whole milk and then homogenized at 2000 psig and pasteurized at 72.2° C. for 16 seconds. 6 grams of Rhodia EZAL MA 011 starter was added along with 2.5 ml of Annatto color. After 40 minutes 88 ml of Calcium chloride was added along with 17 ml of double strength Chymax synthetic rennet. The milk/soy matrix was then allowed to coagulate for a period of 30 minutes. The curd was then cut using cheese knives and allowed to "heal" for 5 minutes. The cut curds were then agitated occasionally for the next 10 minutes and then 50% of the whey was removed. After 10 minutes, the same amount of 54.4° C. water was added slowly. The curds were then heated to 38.9° C. for 20 minutes. The whey was then drained. The curds were then gathered and formed into blocks. These blocks were then turned for the next 15 minutes to drain more whey. The product was then cut, placed into hoops and pressed overnight. The product was then placed in a brine solution for 40 hours and then placed at 4° C. for ripening.

The resulting cheese was 20% more than a control made without isolated soy protein. The texture and melt were similar to the control.

All publications mentioned hereinabove are hereby incorporated in their entirety by reference.

While the foregoing invention has been described in some detail for purposes of clarity and understanding, it will be appreciated by one skilled in the art from a reading of this disclosure that various changes in form and detail can be made without departing from the true scope of the invention and appended claims.

What is claimed is:

1. A molded, pressed, fresh, unripened cheese analog composition prepared by a method comprising:
   (a) mixing isolated soy protein and milk;
   (b) adding a coagulating agent to said mixture from (a);
   (c) cutting the product resulting from (b);
   (d) agitating the product resulting from (c) for about 0 to about 90 minutes at a temperature of about 30° C. to about 50° C.;
   (e) separating about 50% to about 80% of whey from the product resulting from (d) and salting;
   (f) placing the product resulting from (e) in molds at a temperature of at least about 28° C. for about 2 hours to about 8 hours; and
   (g) subjecting the molded product from (f) to external pressure.

2. A molded, pressed, fresh, unripened cheese analog composition comprising milk, isolated soy protein and a coagulating agent.

3. The molded, pressed, fresh, unripened cheese analog composition of claim 2, wherein said milk is present in amounts of from about 95% to about 99.99%.

4. The molded, pressed, fresh, unripened cheese analog composition of claim 2, wherein said milk comprises 0% to 10% fat.

5. The molded, pressed, fresh, unripened cheese analog composition of claim 4, wherein said fat comprises milk fat or vegetable oil.

6. The molded, pressed, fresh, unripened cheese analog composition of claim 2, wherein said soy protein is present in amounts from about 10% to about 100% by weight of the casein present in the finished fresh, unripened cheese analog.

7. The molded, pressed, fresh, unripened cheese analog composition of claim 2 wherein said isolated soy protein has a pH from about 3 to about 7.

8. The molded, pressed, fresh, unripened cheese analog composition of claim 2, further comprising at least one compound selected from the group consisting of transglutaminase, starch; a whitening agent, hydrocolloid gum and a firming agent.

9. The molded, pressed, fresh, unripened cheese analog composition of claim 8, wherein said transglutaminase is present in amounts from about 0% to about 1%.

10. The molded, pressed, fresh, unripened cheese analog composition claim 8, wherein starch is present in amounts from about 0% to about 20%.

11. The molded, pressed, fresh, unripened cheese analog composition of claim 8, wherein said whitening agent is selected from the group consisting of titanium dioxide, benzoyl peroxide, green food coloring and blue food coloring.

12. The molded, pressed, fresh, unripened cheese analog composition of claim 8, wherein said whitening agent is present in amounts from 0% to about 0.5%.

13. The molded, pressed, fresh, unripened cheese analog composition of claim 8, wherein said hydrocolloid gum is selected from the group consisting of carrageenan, carob bean, guar gum and xanthan gum.

14. The molded, pressed, fresh, unripened cheese analog composition of claim 8, wherein said hydrocolloid gum is present in amounts from about 0% to about 2%.

15. The molded, pressed, fresh, unripened cheese analog composition of claim 8, wherein said firming agent is calcium chloride.

16. The molded, pressed, fresh, unripened cheese analog composition of claim 8 wherein said firming agent is present in amounts from about 0% to about 0.5%.

17. The molded, pressed, fresh, unripened cheese analog composition of claim 2, wherein said coagulating agent is selected from the group consisting of rennet and a synthetic rennet equivalent.

18. The molded, pressed, fresh, unripened cheese analog composition of claim 2, further comprising about 2% to about 10% salt.

* * * * *